(No Model.) 2 Sheets—Sheet 1.

P. J. SLAVIN.
BEER COOLER.

No. 551,794. Patented Dec. 24, 1895.

Witnesses
R. H. Newman
Geo. N. Sears

Inventor
Patrick J. Slavin
By his Attorney
C. M. Newman (No Model.) 2 Sheets—Sheet 2.
P. J. SLAVIN.
BEER COOLER.
No. 551,794. Patented Dec. 24, 1895.
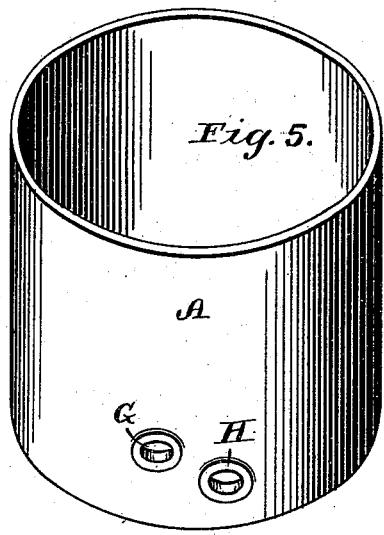
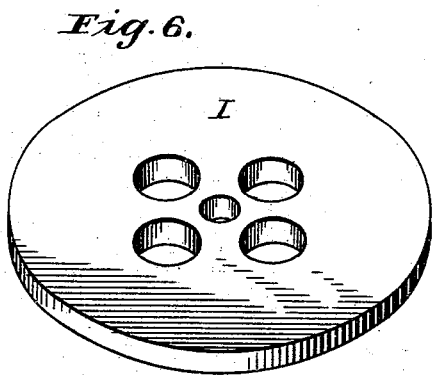
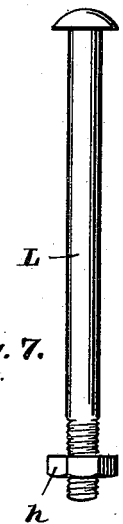
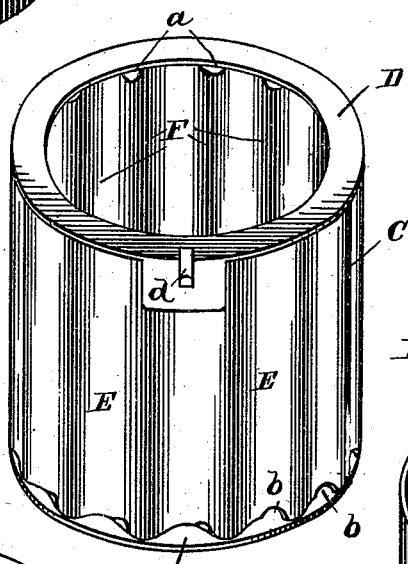
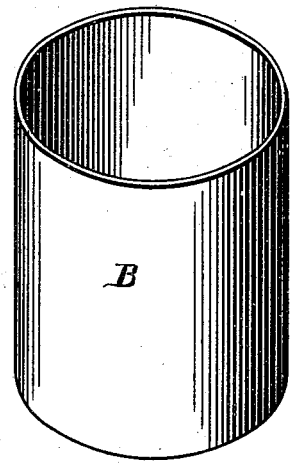
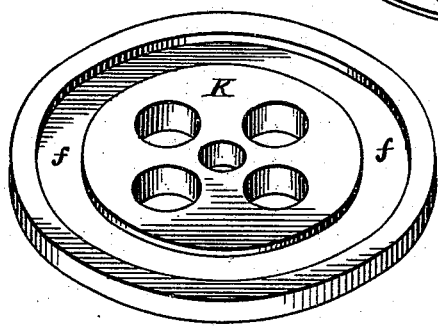
WITNESSES:
R. H. Newman
Geo. R. Sears
INVENTOR
PATRICK J. SLAVIN
BY
C. M. Newman
ATTORNEY.

UNITED STATES PATENT OFFICE.

PATRICK J. SLAVIN, OF WATERBURY, CONNECTICUT, ASSIGNOR OF ONE-HALF TO GEORGE STROBEL, OF SAME PLACE.

BEER-COOLER.

SPECIFICATION forming part of Letters Patent No. 551,794, dated December 24, 1895.

Application filed May 23, 1895. Serial No. 550,351. (No model.)

*To all whom it may concern:*

Be it known that I, PATRICK J. SLAVIN, a citizen of the United States, and a resident of Waterbury, in the county of New Haven and State of Connecticut, have invented certain new and useful Improvements in Cooling Apparatus, of which the following is a specification.

This invention relates to apparatuses for cooling liquids of various kinds, but more particularly distilled or malted liquids.

It is the object of my invention to generally improve upon cooling devices of this class by constructing an apparatus of small dimensions, yet which possesses a lengthy liquid course, and to construct it in such a manner as to permit of it being produced cheaply, yet durable in every essential.

Briefly it consists of three cylindrical bodies, an outer one and an inner one and an intermediate corrugated body. These bodies are constructed in the manner illustrated, having their ends closed by the pieces shown in Figures 6 and 10 and are adapted to be packed in ice.

Upon the accompanying drawings which form a part of this specification the same letters of reference denote like or corresponding parts upon the several figures of the drawings, and of which—

Figure 1:
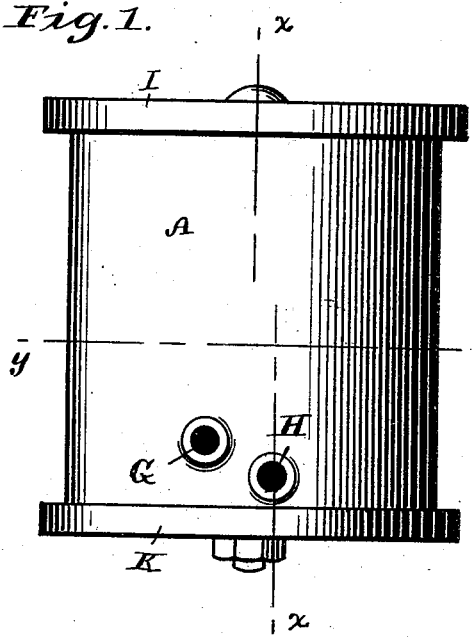
Figure 2:
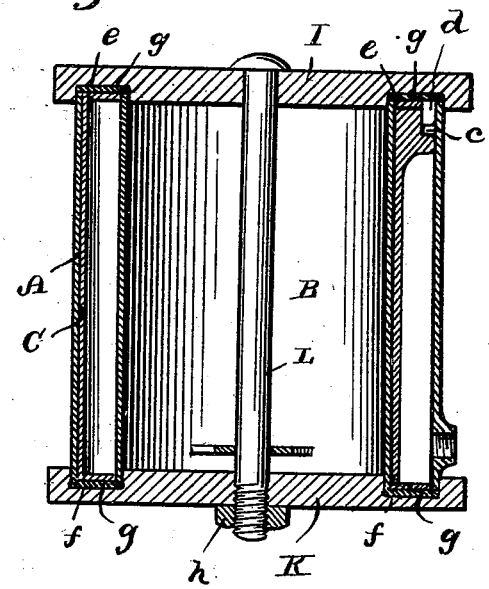
Figure 3:
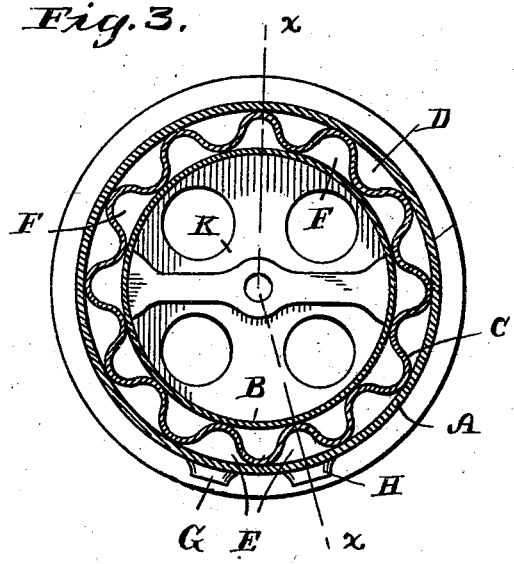
Figure 4:
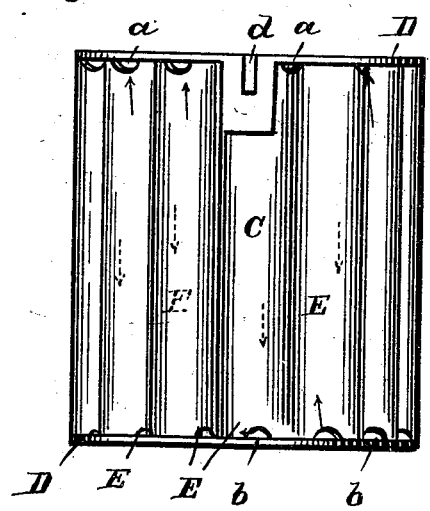

Fig. 1 is a side elevation. Fig. 2 is a central cross-section on line $xx$ of Fig. 1. Fig. 3 is a sectional plan on line $yy$ of Fig. 1. Fig. 4 is a detached side view of the corrugated internal cylinder. Fig. 5 is a perspective view of the outer cylindrical shell. Fig. 6 is a perspective view of the top piece of the cooler. Fig. 7 is a detached elevation of the central bolt which is used for clamping the parts together. Fig. 8 is a detached perspective view of the corrugated cylinder shown in Fig. 4. Figs. 9 and 10 are perspective views of the inner cylinder and the bottom piece respectively.

Referring to the drawings and the letters marked thereon, A indicates the outside cylindrical shell and B indicates the inside shell. These shells are of an equal length, but of a different diameter, the inner one being considerably smaller than the outer one, thus leaving a space between the two. Within this space is fitted a lengthwise corrugated cylindrical body C which is clearly illustrated in Figs. 4 and 8. The opposite ends of the corrugations of this shell are provided with flat rings D which are of a width equal to the said corrugations and which serve to close the ends thereof. When these three shells are assembled in the manner just described and as illustrated, it is obvious that by reason of the corrugations formed in the shell C there are produced two series of chambers E and F upon the sides of the said corrugated shells, and within the before-mentioned shells A and B.

The tap-holes G and H within the outer shell (see Figs. 1, 3, and 5) serve to afford means for connecting the feed and discharge pipes (not shown) with the cooler. The top and bottom of the corrugated chamber of the cylinder C are alternately provided with openings $a$ and $b$ to permit of the passage of the fluid from one chamber to another, the openings $a$, which are at the top, being to pass the liquid from the outer chamber E to the inner chamber F, while the openings $b$ at the bottom pass said liquid from chambers F to E. This construction and arrangement permits of a lengthy, but free and unobstructed, flow of liquid through the apparatus, as may more clearly be understood by reference to the arrows indicated upon the drawings.

I provide a pin $c$ upon the inside of the outer cylinder A, and preferably at the top thereof, for the purpose of engaging a spline $d$ upon the outer periphery of the internal corrugated cylinder C, which insures the proper registering of the tap-holes G and H with the corrugated chambers E E.

In order to insure a perfectly-tight connection for the ends of the fluid-passages between the two cylinders A and B, I provide the top and bottom pieces I and K. (Illustrated in Figs. 2, 6 and 10.) Each of these pieces is provided with a circular groove $e$ and $f$, which is approximately of an equal dimension with that of the main body above described, and is for the purpose of receiving the ends thereof, as shown in Fig. 2. In this connection I also provide a suitable packing $g$, which insures a perfectly-tight connection for the fluid.

The top and bottom pieces I and K are held firmly in their respective places by means of a central bolt L, the upper end of which is provided with a head, and the lower end thereof is threaded and fitted with a nut $h$ for firmly clamping the parts in position.

I am aware that various forms of cooling apparatuses have been invented, among which are found conical tubular bodies provided with spiral or thread-like grooves. My invention does not refer to any such construction, but refers to the combination of parts, and construction described and recited in the following claims.

Having thus described my invention, I claim—

1. In a liquid cooling apparatus of the class described the combination of two cylindrical shells one within the other, a corrugated shell fitted between said cylindrical shells, fluid passages arranged alternately from one corrugation to another, and an inlet and outlet suitably arranged to permit of the passage of fluid through the apparatus.

2. In a liquid cooling apparatus of the class specified the combination with two cylindrical shells one within the other, of tap holes G and H within the outer shell, a lengthwise corrugated shell fitted between the before mentioned cylindrical shells, a top and bottom piece adapted to fit over the ends of the shells, and means for clamping said pieces in their respective places.

3. In a liquid cooling apparatus of the class specified, the combination with two cylindrical shells one within the other, of an inlet and outlet through one of said shells, an intermediate corrugated shell fitted between said inner and outer cylindrical shells, fluid passages at opposite ends of said corrugations, thus permitting a continuous flow of fluid through said corrugated chambers, pieces I and K fitted over the ends of the shells, in substantially the manner shown.

4. A liquid cooling apparatus of the class described, the combination with a cylindrical shell B, of a lengthwise corrugated shell fitted around said cylindrical shell and provided with fluid passages at opposite ends of said corrugations, rings D secured to the end of the corrugated shell and closing the end thereof, an outer shell fitted over said corrugated shell and provided with tap holes to receive and discharge the liquids, top and bottom pieces provided with circular grooves $e$ to receive the ends of the before mentioned shells, and means for clamping said parts in their respective positions.

5. In a liquid cooling apparatus of the class specified the combination with two cylindrical shells one within the other, of tap holes G and H within the outer shell, a lengthwise corrugated shell fitted between the before mentioned cylindrical shells, the pin $c$ secured to outer shell and the groove $d$ in the intermediate shell to insure the proper assembling of the two, a top and bottom piece adapted to fit over the ends of the shells, and means for clamping said pieces in their respective places.

Signed at Waterbury, in the county of New Haven and State of Connecticut, this 16th day of May, A. D. 1895.

PATRICK J. SLAVIN.

Witnesses:
F. ALTON CLARK,
WILSON H. PIERCE.